US011585936B2

(12) United States Patent
Kamimura

(10) Patent No.: US 11,585,936 B2
(45) Date of Patent: Feb. 21, 2023

(54) RANGE IMAGING CAMERA AND RANGE IMAGING METHOD

(71) Applicant: Hitachi-LG Data Storage, Inc., Tokyo (JP)

(72) Inventor: Toshio Kamimura, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 915 days.

(21) Appl. No.: 16/410,211

(22) Filed: May 13, 2019

(65) Prior Publication Data
US 2019/0369218 A1 Dec. 5, 2019

(30) Foreign Application Priority Data
May 31, 2018 (JP) .............................. JP2018-104783

(51) Int. Cl.
*G01S 17/894* (2020.01)
*G01S 7/4865* (2020.01)
*G01S 7/4915* (2020.01)

(52) U.S. Cl.
CPC .......... *G01S 17/894* (2020.01); *G01S 7/4865* (2013.01); *G01S 7/4915* (2013.01)

(58) Field of Classification Search
CPC ...... G01S 17/89; G01S 17/894; G01S 7/4865; G01S 7/4915
See application file for complete search history.

(56) References Cited

U.S. PATENT DOCUMENTS

| 5,966,678 | A * | 10/1999 | Lam .......................... G06T 5/20 356/73 |
| 9,584,790 | B2 * | 2/2017 | Barsoum .............. H04N 13/122 |
| 2011/0285910 | A1 * | 11/2011 | Bamji ...................... G01S 17/36 348/E9.037 |
| 2012/0263353 | A1 * | 10/2012 | Kitajima ................... G06T 5/20 382/199 |
| 2013/0016900 | A1 * | 1/2013 | Kim .......................... G06T 5/20 382/162 |
| 2017/0212228 | A1 | 7/2017 | Van Nieuwenhove |
| 2018/0120423 | A1 * | 5/2018 | Nishikawa ............ G01S 7/4865 |
| 2019/0383906 | A1 * | 12/2019 | Nakamura .............. G01S 17/10 |

FOREIGN PATENT DOCUMENTS

| JP | 2017-524917 A | 8/2017 |
| WO | 2011078264 A1 | 6/2011 |

OTHER PUBLICATIONS

Japanese Office Action received in corresponding Japanese Application No. 2018-104783 dated Nov. 9, 2021.

* cited by examiner

*Primary Examiner* — Luke D Ratcliffe
(74) *Attorney, Agent, or Firm* — Mattingly & Malur, PC

(57) ABSTRACT

In a range imaging camera, a first range image producing unit produces a first range image by calculating a distance to an object on the basis of the delay time or the received light amount of each pixel produced by a light receiving processing unit. A second range image producing unit produces a second range image by performing filtering for each pixel of the first range image using a group of neighboring pixels including its own pixel. In this case, a pixel group selection unit selects a group of pixels used in the filtering such that at least one of produced values including the delay time and the received light amount produced by the light receiving processing unit and the first range image produced by the first range image producing unit is equal to or larger than a noise component value.

4 Claims, 15 Drawing Sheets

FIG. 4
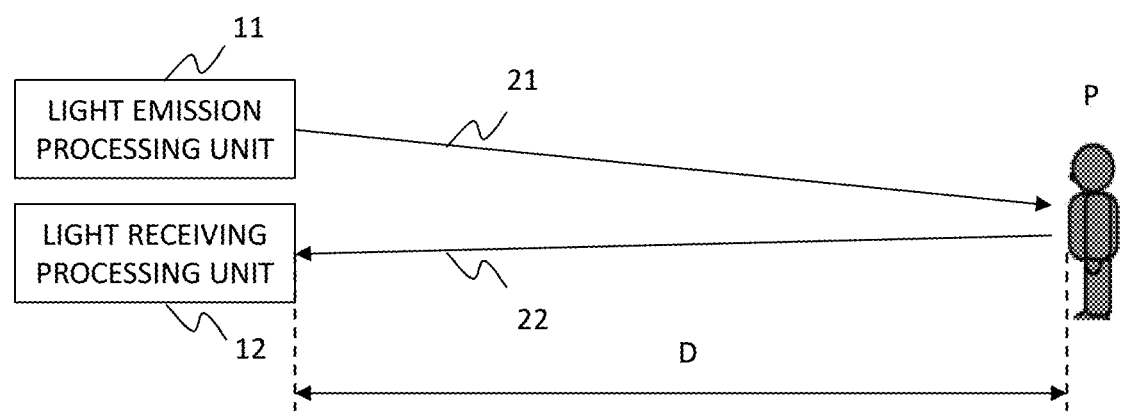
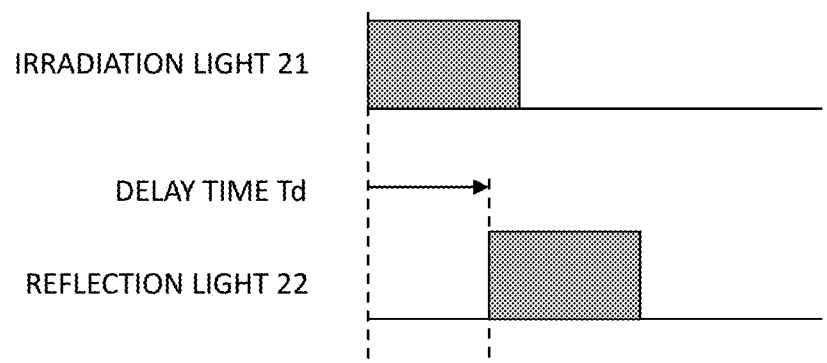

RANGE IMAGING CAMERA AND RANGE IMAGING METHOD

CLAIM OF PRIORITY

The present application claims priority from Japanese patent application serial No. JP 2018-104783, filed on May 31, 2018, the content of which is hereby incorporated by reference into this application.

BACKGROUND OF THE INVENTION

(1) Field of the Invention

The present invention relates to a range imaging camera and a range imaging method for performing range imaging using a time of flight (TOF) method.

(2) Description of the Related Art

With regard to a distance measurement technique based on a TOF method, JP 2017-524917 W discusses a method of binning time-of-flight data from a scene, including phase data and reliability data, in order to more accurately measure the time of flight while suppressing noise to the minimum during TOF measurement. That is, this method includes a step of obtaining a plurality of TOF data by illuminating a scene with a plurality of modulated signals, a step of associating each modulated signal with a vector defined for each of the phase data and the reliability data, a step of adding a plurality of vectors to obtain a vector subjected to the binning, a step of determining a phase and reliability of the vector subjected to the binning, and a step of processing the phase data and the reliability data of the vector subjected to the binning in order to obtain depth data of the scene.

SUMMARY OF THE INVENTION

JP 2017-524917 W discusses TOF type distance measurement, in which a binning vector is obtained by performing vector addition as many as binning target pixels of a vector including a delay time (phase) and a light amount (amplitude) of reflection light, and a distance is calculated using the delay time of this binning vector. However, JP 2017-524917 W fails to discuss a fact that, in the case of an object placed in a far distance or a low reflectance object, the reflection light amount is reduced in an edge portion of an object having a step. That is, in a case where an environmental noise or a sensor noise is superposed while the reflection light amount is small, a ratio of the noise against the received light amount detected by a light receiving element increases, so that distance measurement accuracy is degraded even by employing the binning method disclosed in JP 2017-524917 W.

In view of the aforementioned problems, an object of the present invention is to provide a range imaging camera and a range imaging method capable of preventing degradation of distance measurement accuracy caused by reduction of the received light amount and noise superposition.

According to the present invention, there is provided a range imaging camera including: a light emission processing unit configured to emit irradiation light to a photographing space; a light receiving processing unit configured to receive reflection light from the photographing space using a predetermined number of pixels, produce a delay time from a light emission timing of the irradiation light to a light-receiving timing of the reflection light for each pixel, and produce a received light amount of the reflection light for a predetermined period of time; a first range image producing unit configured to produce a first range image by calculating a distance to the object on the basis of the delay time of each pixel produced by the light receiving processing unit; and a second range image producing unit configured to perform filtering for each pixel of the first range image using a group of neighboring pixels including its own pixel to produce a second range image. The second range image producing unit has a pixel group selection unit configured to select a group of pixels used in the filtering, and the pixel group selection unit selects a group of pixels such that at least one of produced values including the delay time and the received light amount produced by the light receiving processing unit and the first range image produced by the first range image producing unit is equal to or larger than a noise component value contained in the produced value.

According to the present invention, there is provided a range imaging method including: a light emission processing step of emitting irradiation light to a photographing space; a light receiving processing step of receiving reflection light from the photographing space using a predetermined number of pixels, producing a delay time from a light emission timing of the irradiation light to a light-receiving timing of the reflection light for each pixel, and producing a received light amount of the reflection light for a predetermined period of time; a first range image producing step of producing a first range image by calculating a distance to the object on the basis of the delay time of each pixel produced in the light receiving processing step; and a second range image producing step of performing filtering for each pixel of the first range image using a group of neighboring pixels including its own pixel to produce a second range image. The second range image producing step has a pixel group selection step of selecting a group of pixels used in the filtering, and in the pixel group selection step, a group of pixels is selected such that at least one of produced values including the delay time and the received light amount produced in the light receiving processing step and the first range image produced in the first range image producing step is equal to or larger than a noise component value contained in the produced value.

According to the present invention, it is possible to prevent reduction of the received light amount and reduction of the distance measurement accuracy caused by noise superposition in the range imaging camera.

BRIEF DESCRIPTION OF THE DRAWINGS

These and other features, objects and advantages of the present invention will become more apparent from the following description when taken in conjunction with the accompanying drawings wherein:

FIG. 4 is a diagram describing a principle of distance measurement using the TOF type range imaging camera;

DETAILED DESCRIPTION OF THE EMBODIMENT

Embodiments of the present invention will be described with reference to the accompanying drawings. The examples described below are merely for illustrative purposes, and are not intended to exclude any modification that can be readily anticipated in a technical sense.

First Embodiment

In the first embodiment, a basic configuration and operations of a TOF type range imaging camera will be described. Then, a first problem regarding a countermeasure for a case where an environmental noise or a sensor noise is superposed with a small received light amount will be described.

Figure 1:
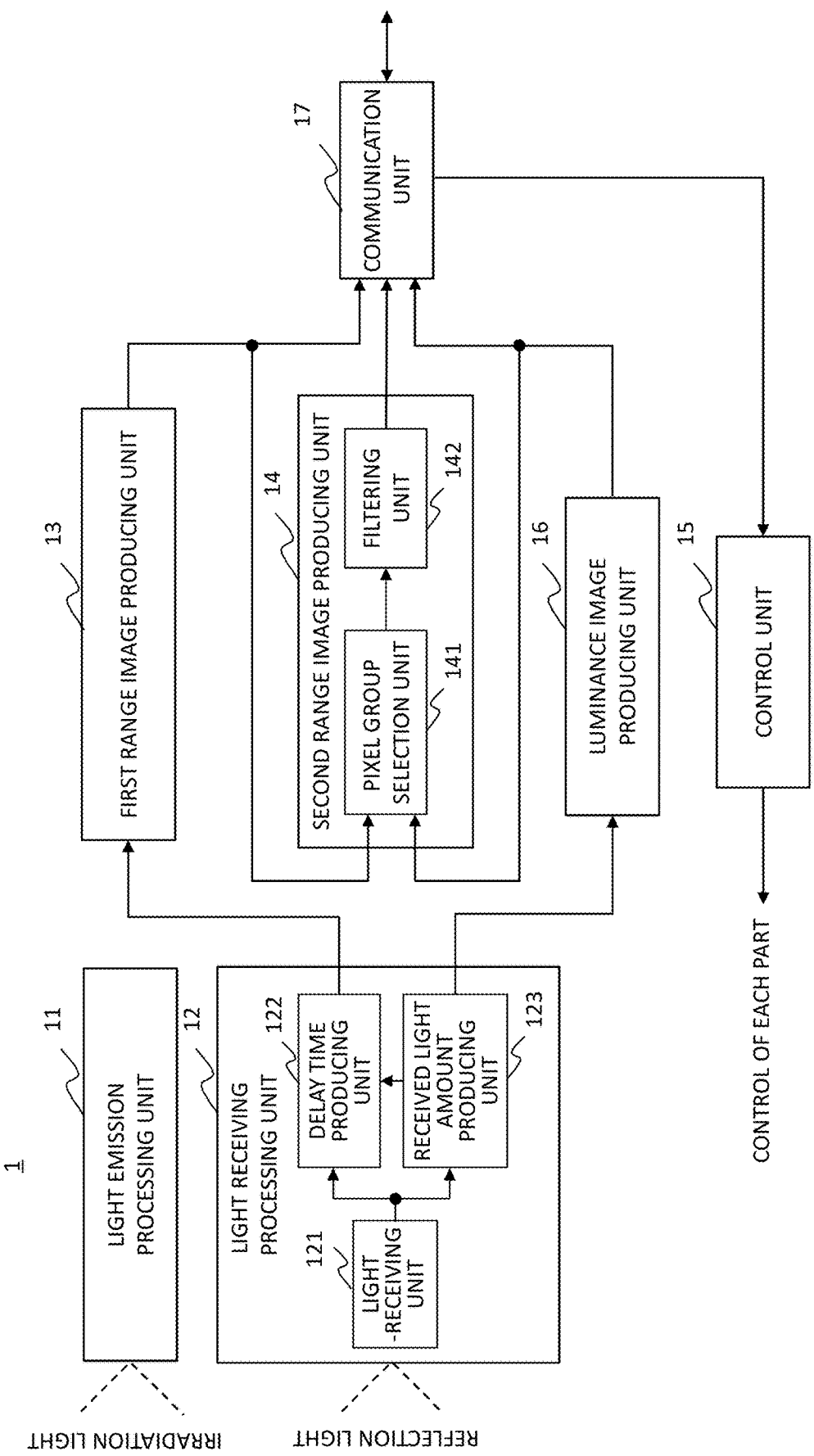
FIG. 1 is a block diagram illustrating a configuration of a TOF type range imaging camera (first embodiment)

FIG. 1 is a block diagram illustrating a configuration of the TOF type range imaging camera. The TOF type range imaging camera 1 produces a range image by measuring a distance to an object using a time of flight of light. The TOF type range imaging camera 1 includes a light emission processing unit 11, a light receiving processing unit 12, a first range image producing unit 13, a second range image producing unit 14, a control unit 15, a luminance image producing unit 16, and a communication unit 17.

The light emission processing unit 11 emits irradiation light to a photographing space. The light receiving processing unit 12 has a light-receiving unit 121 configured to receive reflection light from the photographing space with a predetermined number of pixels, a delay time producing unit 122 configured to produce a delay time for each pixel from a light emission timing of the irradiation light of the light emission processing unit 11 to the light-receiving timing of the reflection light of the light-receiving unit 121, and a received light amount producing unit 123 configured to produce a received light amount of the reflection light for a predetermined period of time. Specifically, the light-receiving unit 121 includes a plurality of light-receiving elements arranged in a two-dimensional space depending on the pixels. Note that the delay time producing unit 122 may indirectly calculate the delay time on the basis of the received light amount produced by the received light amount producing unit 123.

The first range image producing unit 13 produces a first range image from the delay time of each pixel produced by the light receiving processing unit 12. That is, the first range image producing unit 13 calculates a distance to a subject from the delay time, and produces, for example, an image subjected to a coloring process for changing colors depending on the distance.

The second range image producing unit 14 has a filtering unit 142 that performs filtering for each pixel of the first range image produced by the first range image producing unit 13 using a group of neighboring pixels including its own pixel to produce a second range image and a pixel group selection unit 141 that selects a group of pixels used in the filtering. By performing the filtering, it is possible to reduce influence of the noise included in each pixel of the range image. For example, the pixel group selection unit 141 sets a group of pixels (3×3 pixels) including a filtering target pixel and its neighboring pixels as a group of candidate pixels used in the filtering and selects a pixel suitable for a selection condition described below.

The luminance image producing unit 16 produces a luminance image from the received light amounts for each pixel in the light receiving processing unit 12. That is, the luminance image is a typical photographic image depending on an intensity of the reflection light from a subject. The communication unit 17 externally transmits or receives the first and second range images, the luminance image, and the control information.

The control unit 15 controls each part. Specifically, the control unit 15 instructs the light emission processing unit 11 to start/terminate light emission, instructs the light receiving processing unit 12 to start/terminate receiving light, and instructs to produce the delay time or the received light amount. In addition, the control unit 15 instructs the first range image producing unit 13 to produce a first range, instructs the second range image producing unit 14 to select a group of pixels used in filtering and produce a second range, and instructs the luminance image producing unit 16 to produce a luminance image. Furthermore, the control unit 15 instructs the communication unit 17 to transmit or receive the first and second range images and the luminance image.

Note that, since a main purpose of the TOF type range imaging camera 1 is to produce a range image, the luminance image producing unit 16 may not be provided in the TOF type range imaging camera 1.

Next, an outline of the operations of the TOF type range imaging camera will be described.

Figure 2:
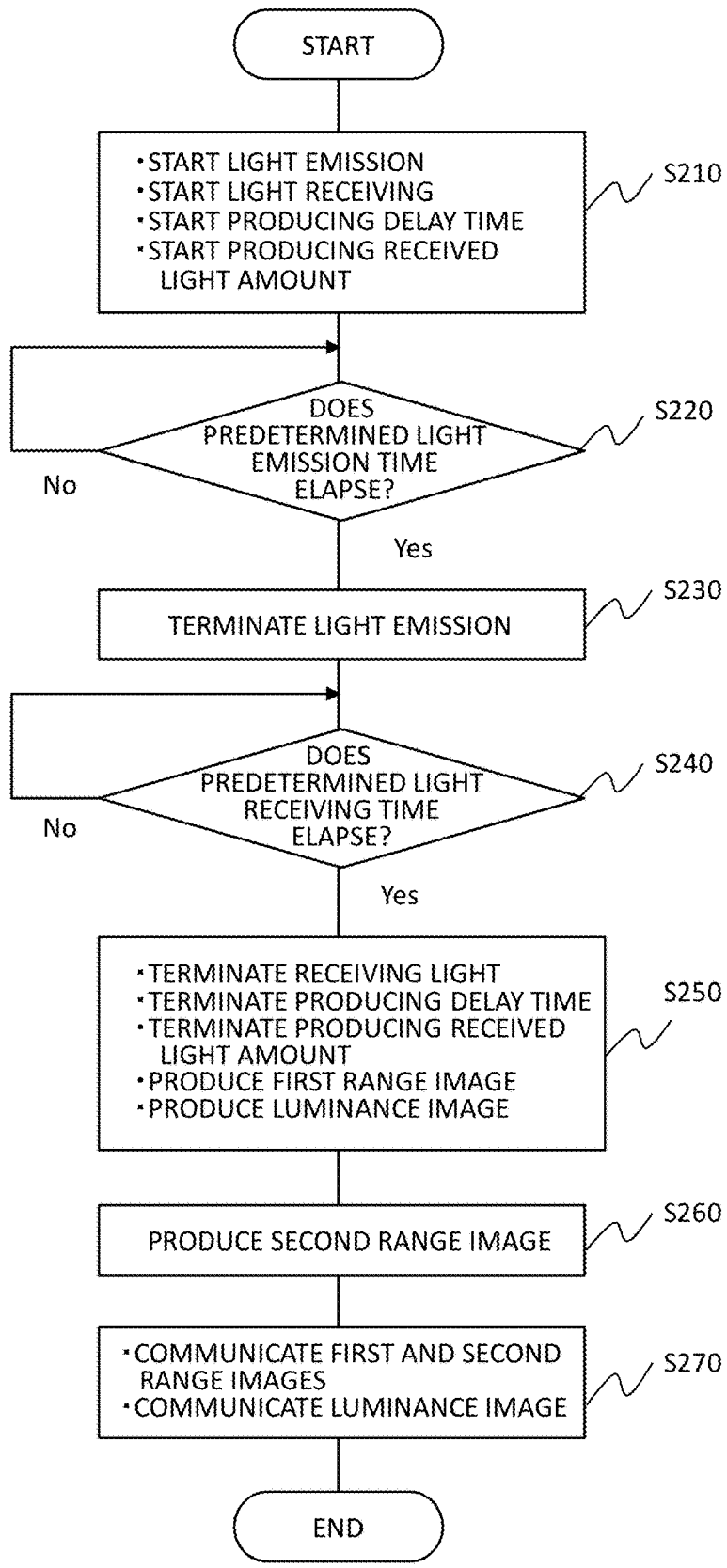
FIG. 2 is a flowchart illustrating operations of the TOF type range imaging camera.
Figure 3:
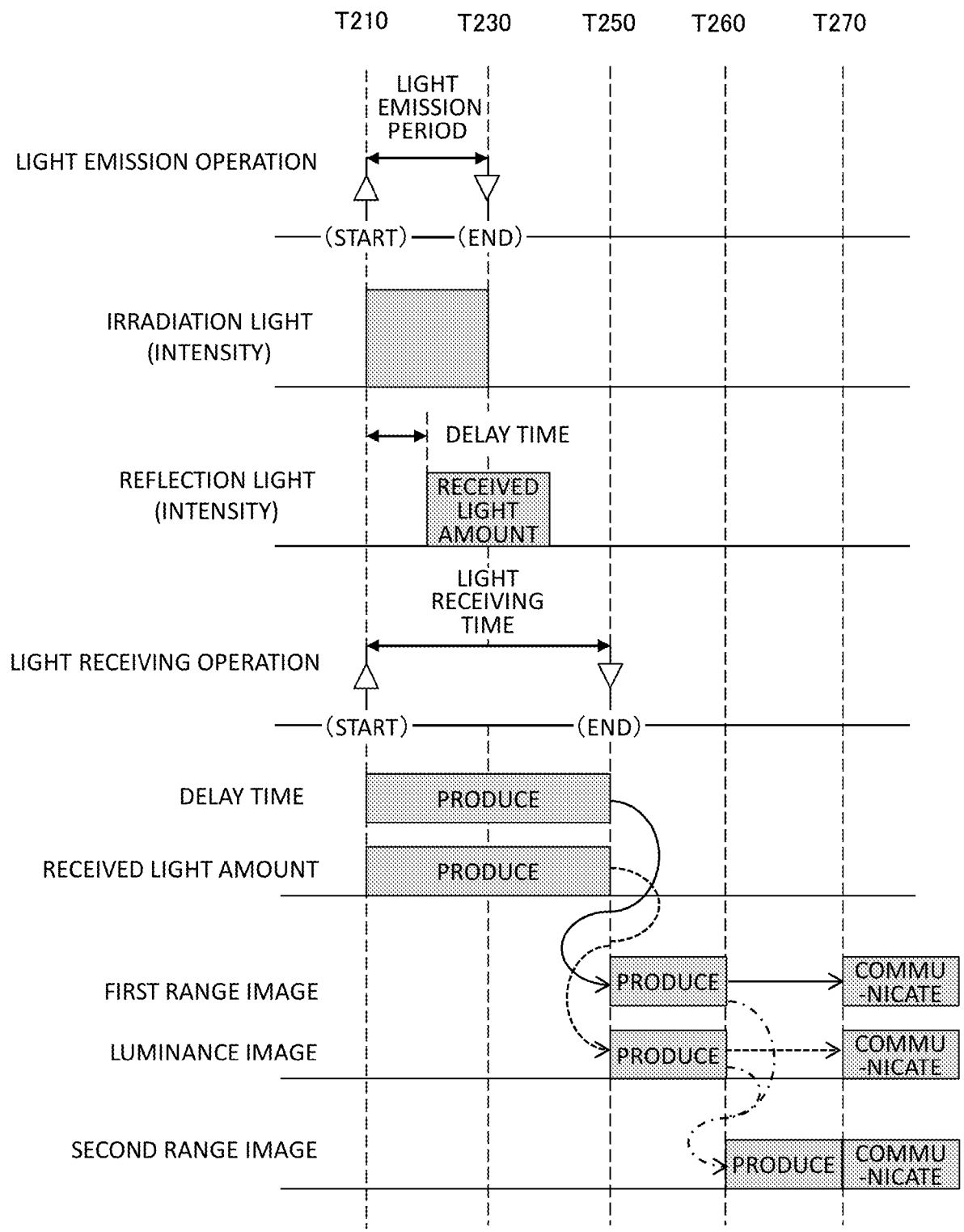
FIG. 3 is a timing chart illustrating operations of the TOF type range imaging camera.

FIG. 2 is a flowchart illustrating the operations of the TOF type range imaging camera. In addition, FIG. 3 is a timing chart illustrating the operations of the TOF type range imaging camera. Here, the description will be made with reference to FIGS. 2 and 3.

The operation flows of FIG. 2 and the operation timings of FIG. 3 are controlled by the control unit 15 as a range imaging instruction is received from the outside via the communication unit 17. In addition, reference numerals S210 to S270 designated to each operation flows of FIG. 2 correspond to reference numerals T210 to T270 of each operation timing of FIG. 3. Furthermore, FIG. 3 illustrates states of the irradiation light and the reflection light in the photographing space, the delay time, the received light amount, the first and second range images, or the producing timing of the luminance image as various state changes caused by the operation flows of FIG. 2. Moreover, the operation flows of FIG. 2 and the operation timings of FIG. 3 show a single image producing operation, which is repeatedly executed. Hereinafter, the operation flows (operation timings) will be described sequentially.

In S210 (T210), the light emission processing unit 11 starts emitting light, and the light receiving processing unit 12 starts receiving light. In addition, the light receiving processing unit 12 starts producing the delay time and the received light amount.

In S220, it is determined whether or not the light emission operation of the light emission processing unit 11 is performed for a predetermined light emission time. If it is determined Yes, the process advances to S230. Otherwise, S220 is repeated.

In S230 (T230), the light emission processing unit 11 terminates emitting light.

In S240, it is determined whether or not the light receiving operation of the light receiving processing unit 12 is performed for a predetermined light receiving time. If it is determined Yes, the process advances to S250. Otherwise, S240 is repeated. Although the light receiving time is set as a period of time here, the light may be received for two separate periods of time as described below.

In S250 (T250), the light receiving processing unit 12 terminates receiving the light, producing the delay time, and producing the received light amount. Here, the delay time refers to time elapsing until the reflection light is received from emission of the irradiation light, and the received light amount refers to the amount of light received within the light receiving time. As described below, the delay time is calculated from the received light amount for two light-receiving periods. In addition, the first range image producing unit 13 produces a first range image on the basis of the delay time, and the luminance image producing unit 16 produces a luminance image on the basis of the received light amount.

In S260 (T260), the second range image producing unit 14 performs filtering on the basis of the first range image or the luminance image to produce a second range image.

In S270 (T270), the communication unit 17 performs communication of the first and second range images and the luminance image that have been produced.

FIG. 4 is a diagram describing a principle of distance measurement using the TOF type range imaging camera. It is assumed that the light emission processing unit 11 and the light receiving processing unit 12 are arranged in locations regarded as the same place in the photographing space, and an object P is placed far from this location by a distance D. Here, when the light emission processing unit 11 emits pulsed irradiation light 21, this irradiation light arrives at the object and is reflected, so that its reflection light is returned to the light receiving processing unit 12. In this case, a delay time Td is produced at the light emission timing of the irradiation light of the light emission processing unit 11 and at the light-receiving timing of the reflection light of the light receiving processing unit 12 depending on the time of flight of the light corresponding to a round-trip distance between the light emission processing unit 11 (light receiving processing unit 12) and the object.

A relationship between the distance D and the delay time Td can be expressed as Formula (1).

$$\text{Distance } D = \text{Delay Time} \times \text{Light Speed} \times (1/2) \quad (1)$$

That is, the distance D can be calculated by measuring the delay time Td.

In this measurement method, since it is necessary to measure the delay time with high accuracy, it is necessary to perform counting by driving a high-speed clock. In this regard, there is a practical method in which the delay time Td is not directly measured, but is indirectly obtained from the received light amount. According to this embodiment, this indirect measurement method is employed.

Figure 5:
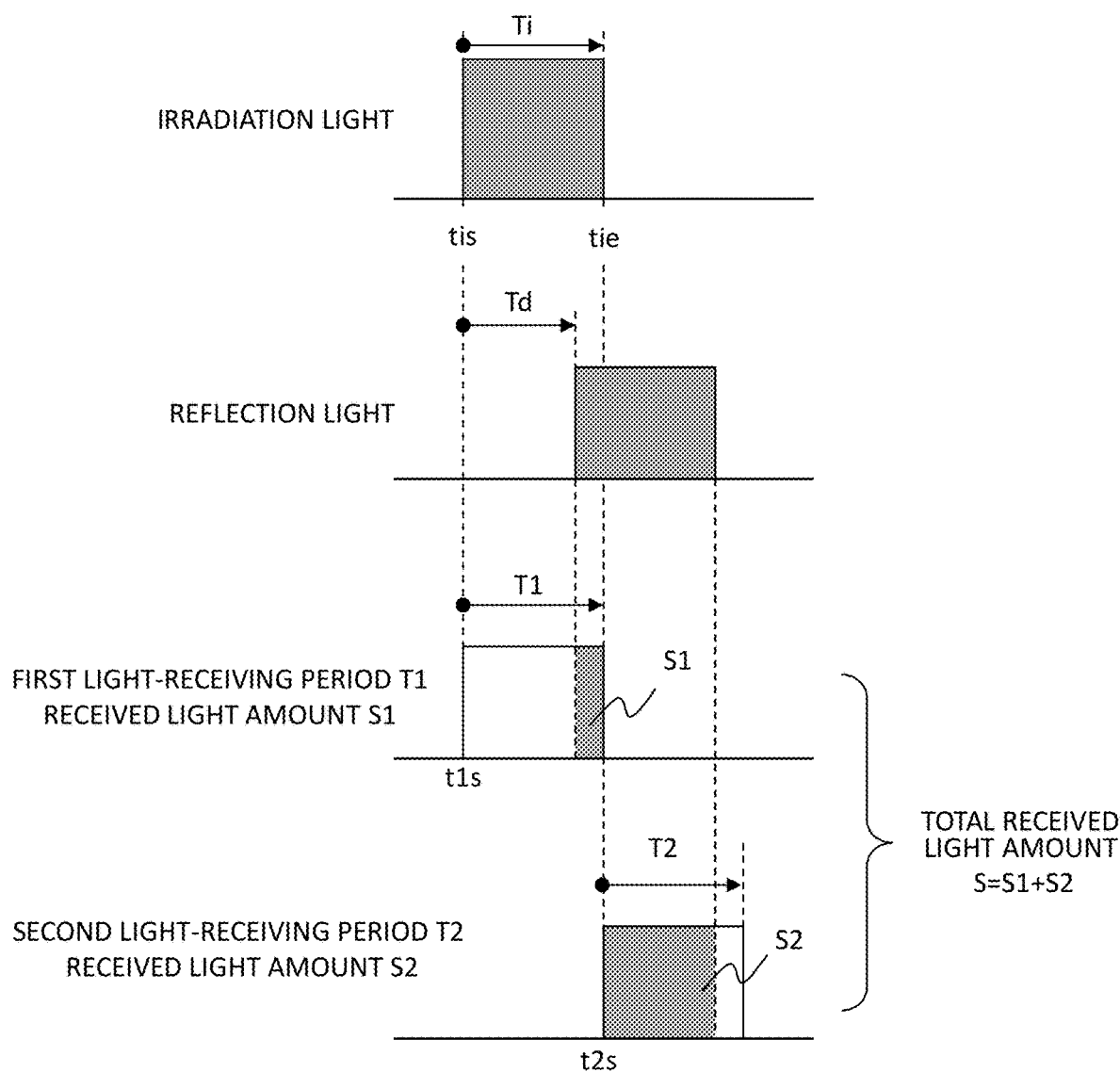
FIG. 5 is a diagram describing an indirect distance measurement method.

FIG. 5 is a diagram describing an indirect distance measurement method (indirect TOF distance measurement). In the indirect TOF distance measurement, a delay time based on the time of flight of the light is measured indirectly from the received light amount. In addition, in order to measure this received light amount, a light receiving element is used in the light-receiving unit 121.

In the indirect TOF distance measurement, for a single light emission operation, the light receiving operation is performed separately for two periods (first and second light-receiving periods). The light emission period (light emission time) of the irradiation light is denoted by "Ti", its start point is denoted by "tis", and its end point is denoted by "tie". Meanwhile, the light-receiving period of the reflection light includes a first light-receiving period T1 and a second light-receiving period T2, each of which has the same length as that of the light emission period Ti. For the light-receiving timing, the start point tis of the first light-receiving period T1 is set to the light emission start point "tis", and the start point t2s of the second light-receiving period T2 is set to the light emission end point "tie". Using this method, the received light amount S1 of the first light-receiving period T1 and the received light amount S2 of the second light-receiving period T2 are measured.

In this case, the delay time Td and the distance D to the object can be calculated on the basis of Formulas (2), (3), and (4) using the received light amounts S1 and S2.

$$\text{Total received light amount } S = \text{First received light amount } S1 + \text{Second received light amount } S2 \quad (2)$$

$$\text{Delay time } Td = \text{Light emission time } Ti \times \text{Second received light amount } S2/\text{Total received light amount } S \quad (3)$$

$$\text{Distance } D = \text{Delay time } Td \times \text{Light speed} \times (1/2) = Ti \times S2/(S1+S2) \times \text{Light speed} \times (1/2) \quad (4)$$

That is, the distance D is calculated by measuring the first and second received light amounts S1 and S2. This indirect measurement method is practical because it is not necessary to measure the delay time with high accuracy. However, measurement accuracy for the received light amount is required.

Next, factors that degrade the measurement accuracy in the indirect distance measurement method (indirect TOF distance measurement) will be described. In the first embodiment, reduction of the received light amount and noise superposition are selected as the degradation factors.

Figure 6:
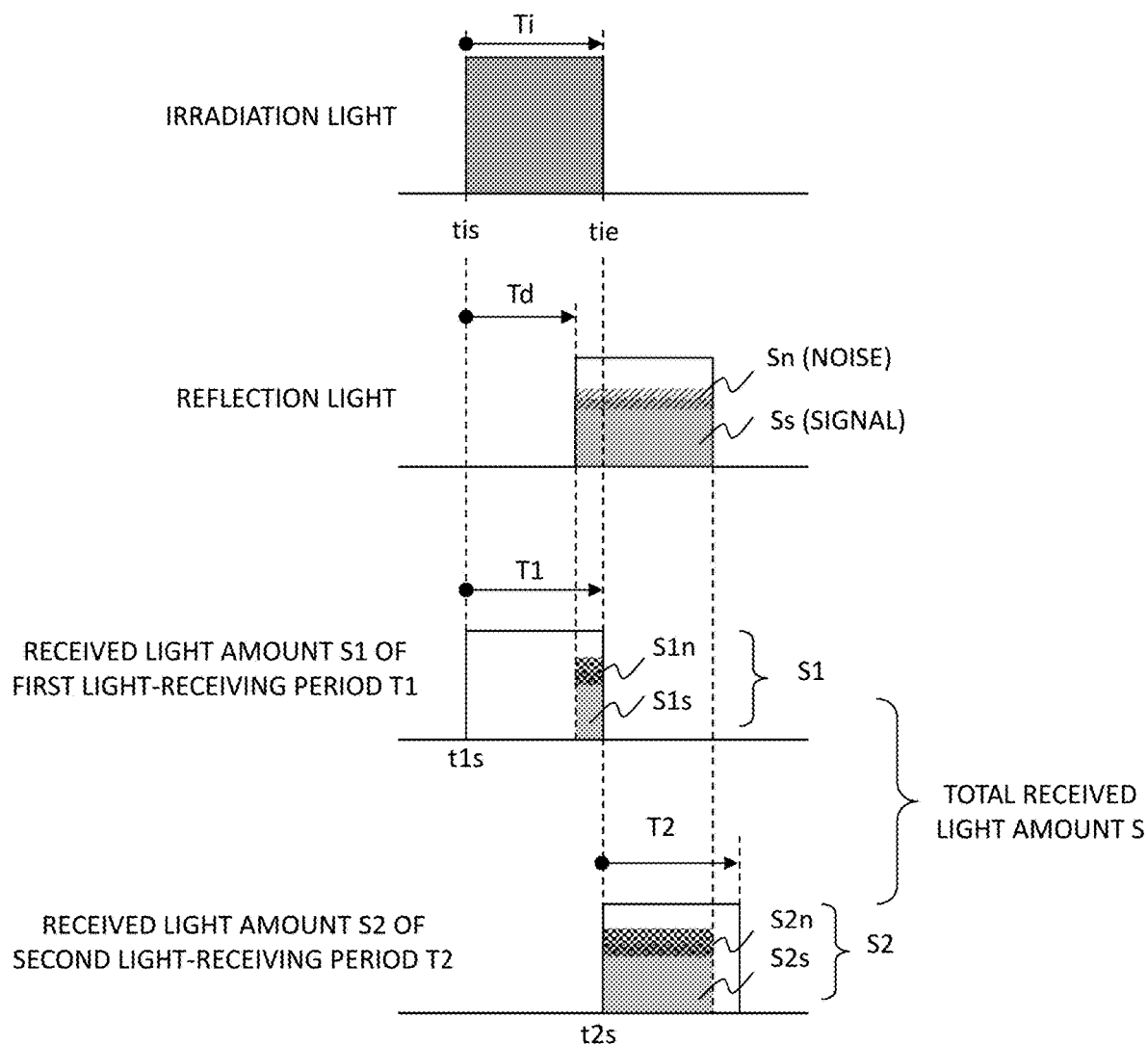
FIG. 6 is a diagram describing an effect on measurement accuracy caused by reduction of the received light amount and noise superposition.

FIG. 6 is a diagram describing influence on the measurement accuracy caused by reduction of the received light amount and noise superposition. When the distance to the object is far, or when the reflectance of the object is small, the intensity Ss of the reflection light from the object is attenuated, so that the received light amounts S1s and S2s for the light-receiving periods T1 and T2, respectively, are reduced. In addition, at the time of receiving light, an environmental noise, a sensor noise (such as a shot noise), or the like randomly produced is superposed as received light amount noises S1n and S2n. Due to such factors, a signal-to-noise (S/N) ratio of the received light amount S2 in the aforementioned Formula (3) is reduced, so that the calculation accuracy for the delay time Td, that is, the measurement accuracy of the distance D is degraded. Note that, even when the environmental noise or the sensor noise at the time of measurement exists constantly, the S/N ratio is reduced as the received light amount is reduced (hereinafter, referred to as "first problem").

Figure 7A:
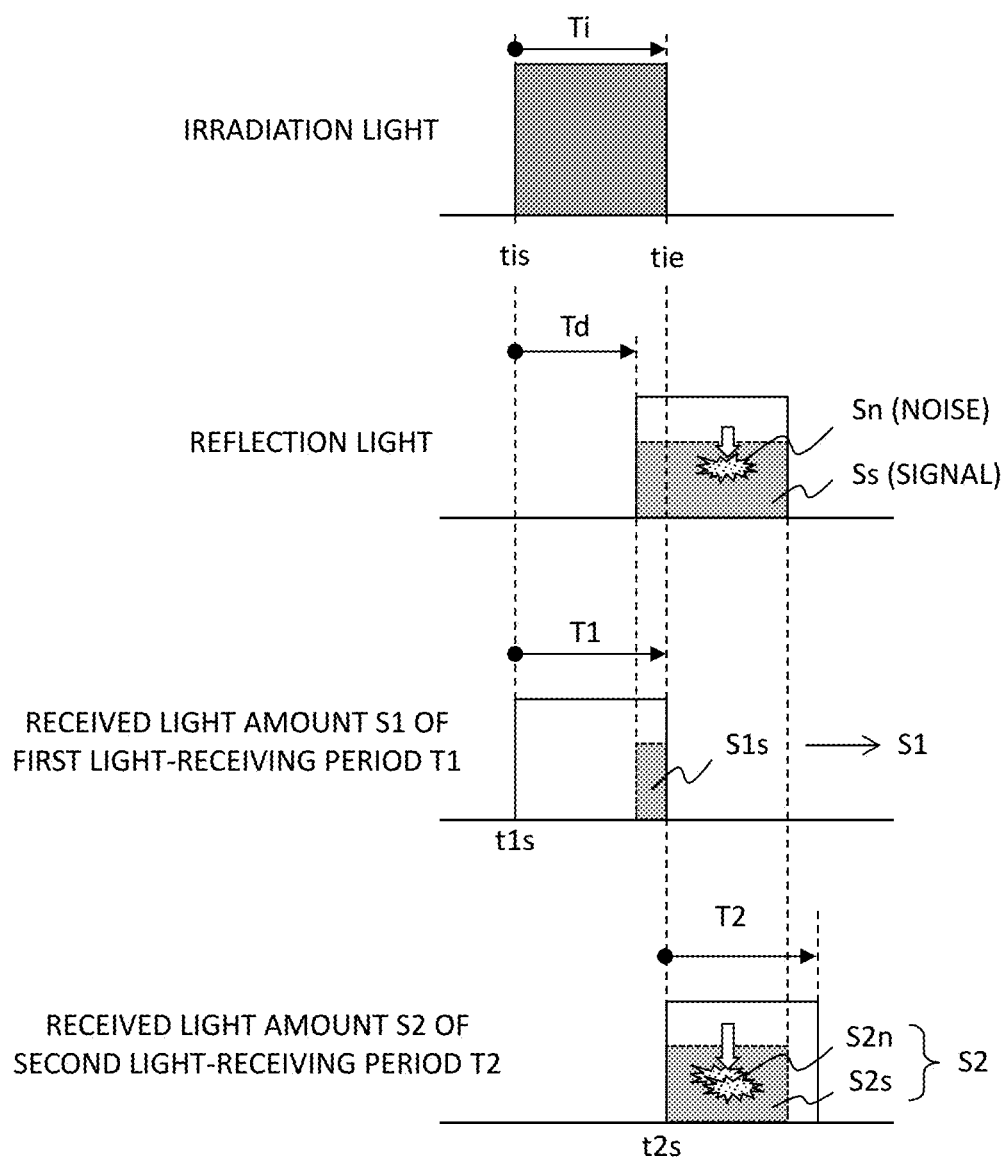
FIG. 7A is a diagram describing error occurrence at the time of measurement caused by a first problem (reduction of the received light amount)
Figure 7B:
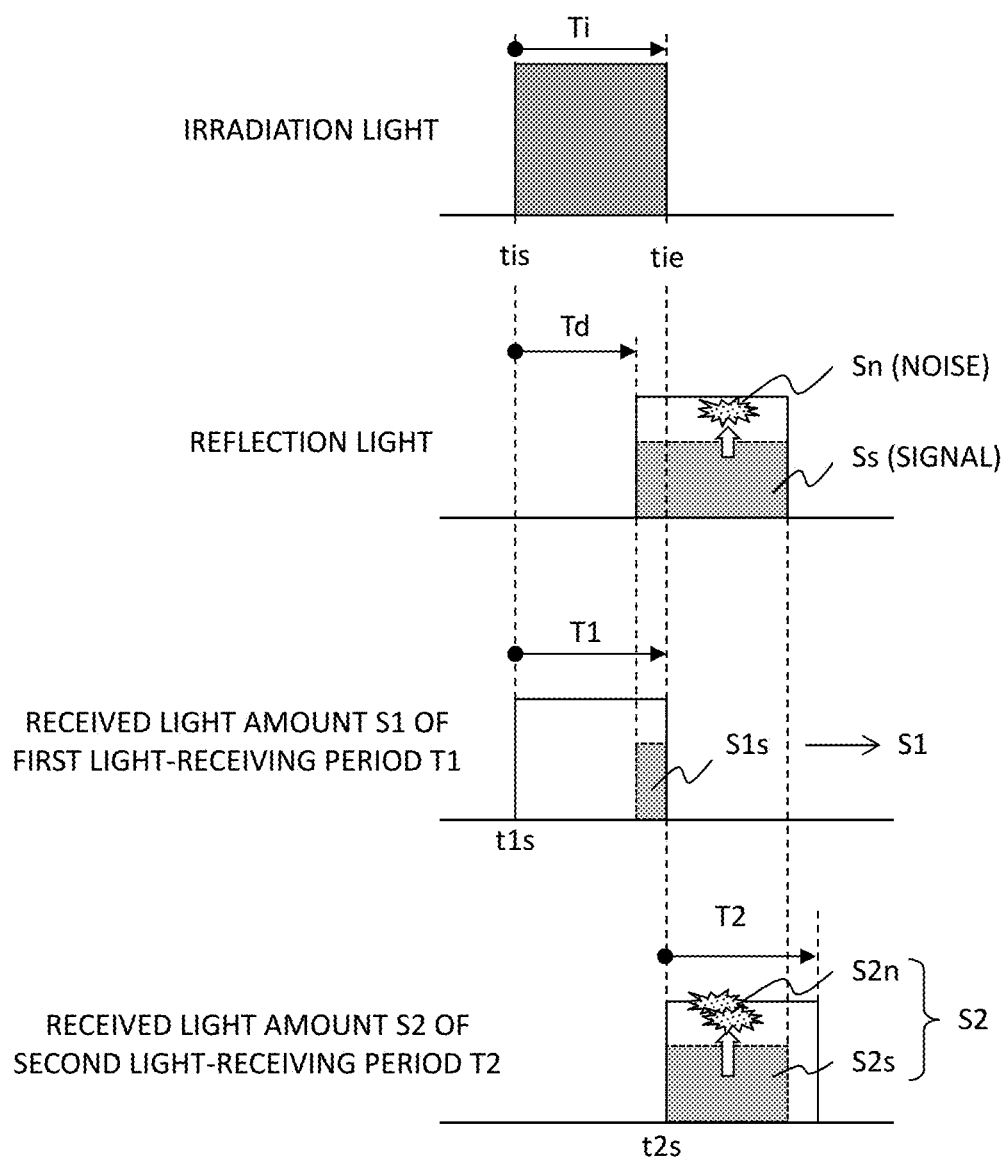
FIG. 7B is a diagram describing error occurrence at the time of measurement caused by the first problem (reduction of the received light amount)

FIGS. 7A and 7B are diagrams describing error occurrence during the measurement caused by the first problem (reduction of the received light amount). As illustrated in FIGS. 7A and 7B, the intensity Ss of the reflection light is attenuated, so that the levels of the received light amounts S1s and S2s for the light-receiving periods T1 and T2, respectively, are reduced.

In FIG. 7A, during the second light-receiving period T2, the environmental noise and the sensor noise S2n are randomly mixed and are superposed so as to be subtracted from the received light amount S2s. For this reason, the received light amount S2 is measured to be smaller than its real value, and the delay time Td and the distance D in Formulas (3) and (4) are calculated to be smaller their real values.

Meanwhile, in FIG. 7B, the environmental noise and the sensor noise S2n are randomly mixed during the second light-receiving period T2 and are superposed so as to be added to the received light amount S2s. For this reason, the received light amount S2 is measured to be larger than its real value, and the delay time Td and the distance D in Formulas (3) and (4) are calculated to be larger than their real values.

While the measurement accuracy for a single pixel position has been described hereinbefore, the filtering unit 142 of the second range image producing unit 14 in the light-receiving unit 121 in which a plurality of pixels are arranged in a matrix shape performs filtering between neighboring pixels. In the filtering, an average of the measurement values for a plurality of neighboring pixels including its own pixel is obtained, and this average is set as a measurement value of its own pixel. This may reduce influence of noise produced randomly. However, as described in the first problem, if the S/N ratio is reduced as the received light amount is reduced, it is difficult to sufficiently reduce the measurement error through a simple filtering process.

Note that, basically, the first range image producing unit 13 produces the first range image from the delay time of each pixel, and the pixel group selection unit 141 selects each pixel and its neighboring pixels, so that the filtering unit 142 produces the second range image by filtering the distance information. However, since the distance information and the delay time are in a linear relationship, the following description will be made using the delay time instead of the distance information.

Figure 8:
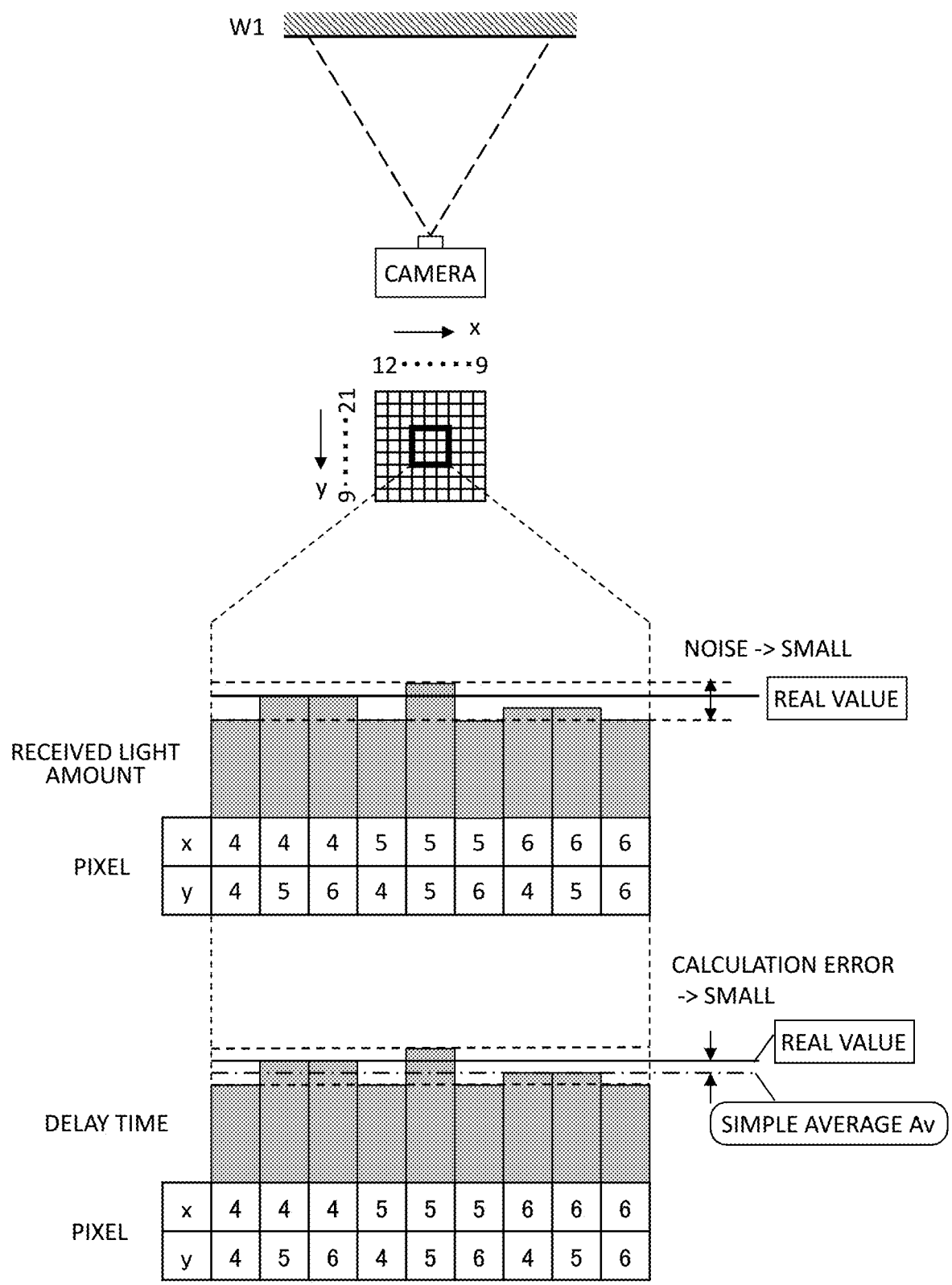
FIG. 8 is a diagram describing an effect of filtering between a plurality of pixels (without the first problem)
Figure 9:
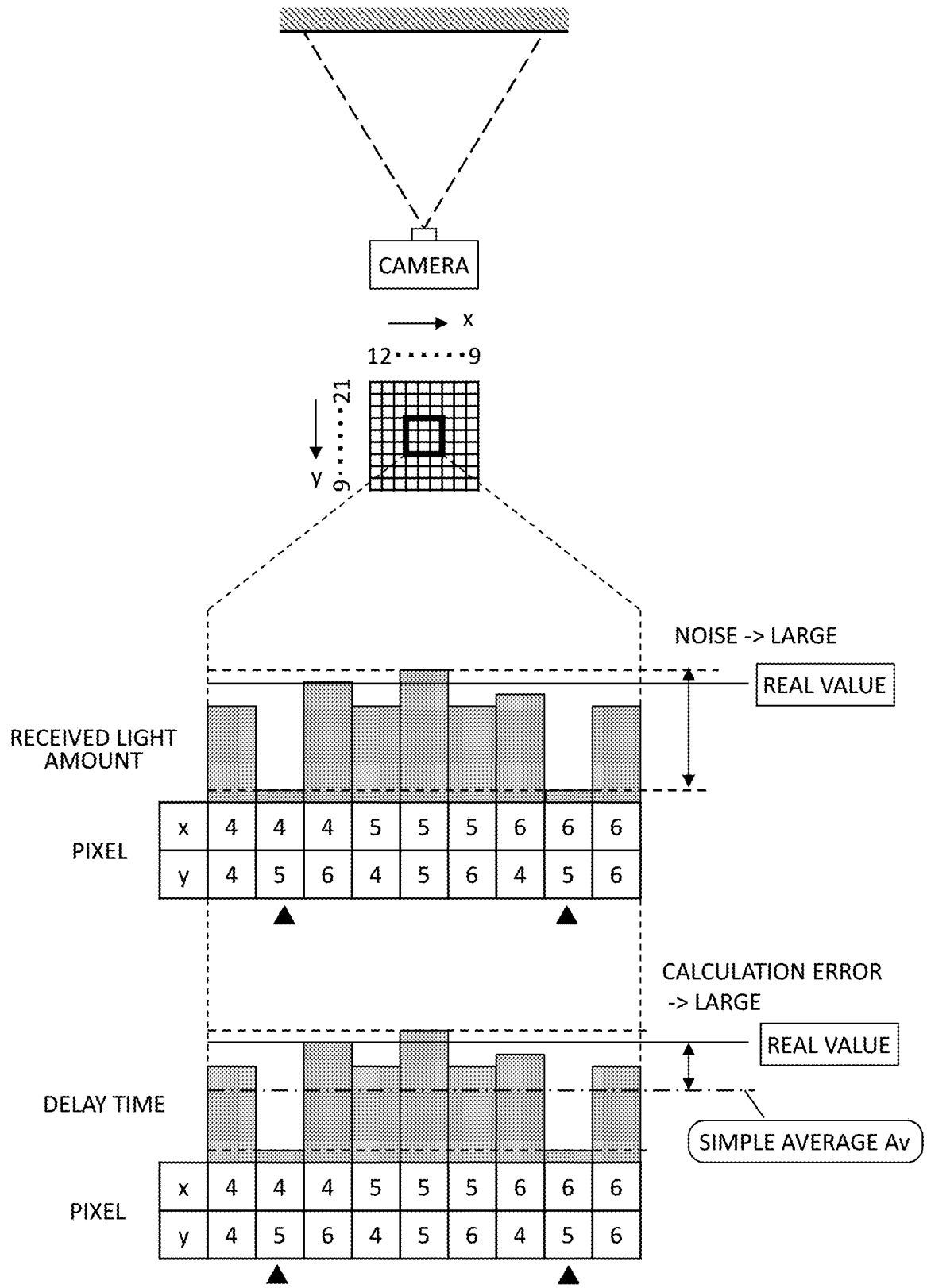
FIG. 9 is a diagram describing an effect of filtering between a plurality of pixels (with the first problem)

FIGS. 8 and 9 are diagrams describing an effect of the filtering between a plurality of pixels. FIG. 8 illustrates a case where the received light amount is large, and the noise influence is relatively small (without the first problem), and FIG. 9 illustrates a case where the received light amount is reduced, and the noise influence is relatively large (with the first problem).

Here, the flat wall W1 is the measurement target similarly in FIGS. 8 and 9. In addition, the light-receiving unit 121 of the camera has a light receiving element group of 9×9 pixels arranged on the x-y plane. Note that each pixel is represented by its coordinates (x, y) for distinguishing them. The pixel group selection unit 141 selects a group of nine pixels (3×3=9) centering on the filter target pixel as a neighboring pixel for filtering, and the filtering unit 142 performs simple average filtering using the selected group of pixels. Here, FIGS. 8 and 9 show the received light amounts measured from each pixel and the delay times calculated from the measured received light amounts for a group of nine pixels arranged oppositely across the pixel locations (4, 4) and (6, 6) centering on the filtering target pixel (5, 5). Note that, since the measurement target is the flat wall W1, the real values of the received light amount and the delay time are constant in each pixel. Furthermore, the delay time represents the simple average Av as a result of the filtering of the filtering unit 142.

First, in the case of FIG. 8, the received light amounts of each pixel are within a range in which the noise influence is small relative to their real values. In addition, the delay times of each pixel based on the received light amounts are also within a range in which the noise influence is small relative to their real values. In this case, the simple average Av of the delay time for a group of nine pixels results in a calculation error negligible with respect to their real values. That is, a filtering effect is recognized.

Meanwhile, in the case of FIG. 9, for the received light amounts of each pixel, the pixels (4, 5) and (6, 5) significantly affected by noise (indicated by solid triangles) relative to their real values are included. Therefore, for the delay times of each pixel based on the received light amounts, the pixels significantly affected by noise (indicated by solid triangles) relative to their real values are also included. In this case, the simple average Av of the delay time for a group of nine pixels results in a calculation error significant with respect to their real values. That is, in this case, the filtering effect is not recognized, but the error increases.

As described above, when the distance to the object is long, or when the reflectance of the object is small, the S/N ratio is reduced as the received light amount is reduced. Therefore, it is difficult to sufficiently reduce the measurement error through simple filtering. This is because selection of a group of the neighboring pixels in the filtering is determined only on the basis of the positional relationship with the filtering target pixel (for example, whether or not it is neighboring), and as a result, the filtering is performed including a pixel significantly affected by noise.

In this regard, according to this embodiment, in order to address this problem, the pixel group selection unit 141 selects only a group of pixels having little noise influence out of groups of neighboring pixels by excluding a group of pixels significantly affected by noise. In addition, the filtering unit 142 performs filtering only using the selected group of pixels having little noise influence. As a result, even when the received light amount from the object is reduced, and the S/N ratio is reduced, it is possible to prevent an increase of the error in the distance measurement. That is, a condition for selecting a group of pixels (hereinafter, referred to as "first condition") defined in the first embodiment is to select a pixel having the received light amount of the received light amount producing unit 123 equal to or larger than a noise component value included in the pixel.

Figure 10:
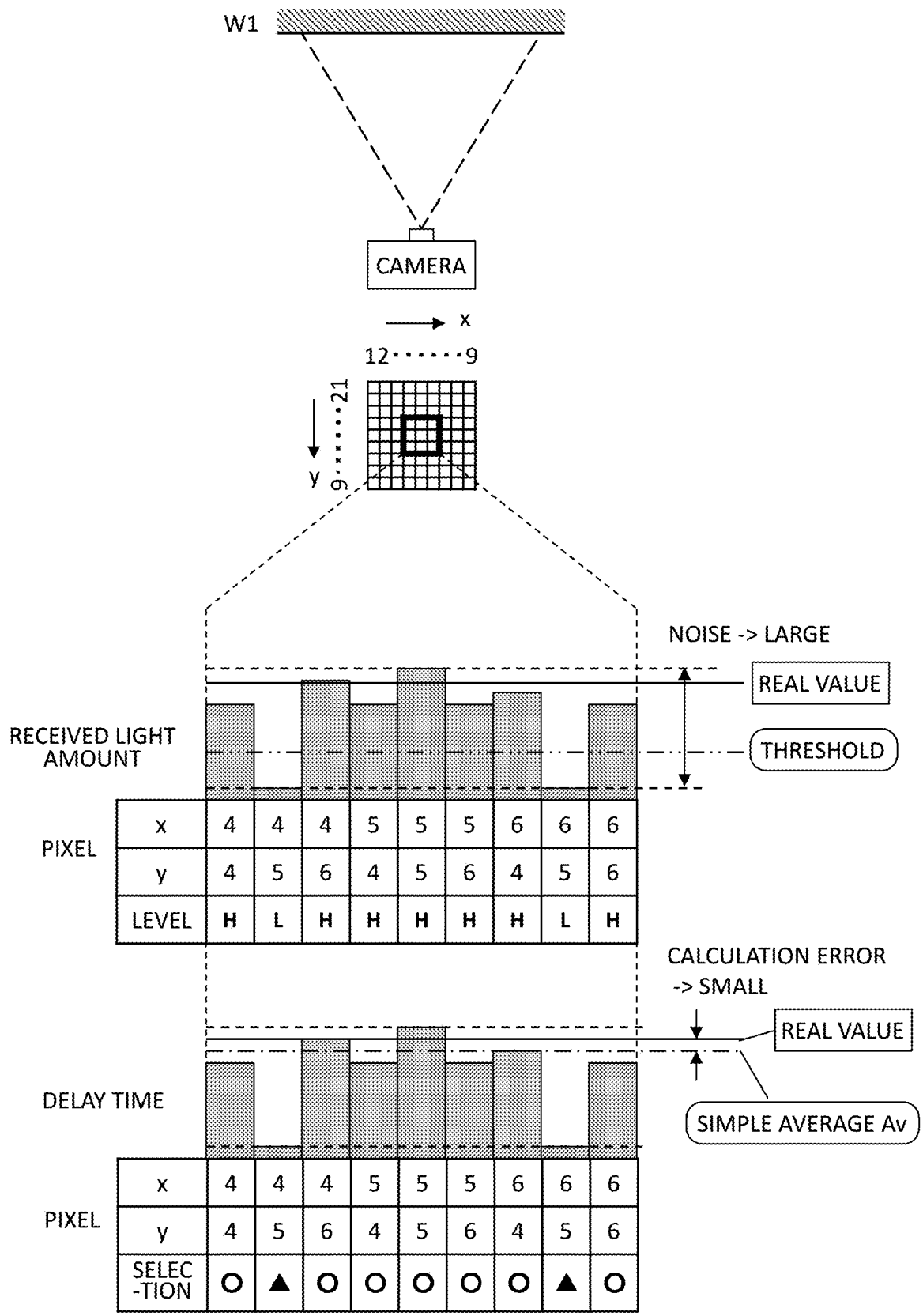
FIG. 10 is a diagram illustrating a filtering result when a group of pixels is selected depending on a first condition.

FIG. 10 is a diagram illustrating a filtering result in a case where a group of pixels is selected so as to satisfy the first condition of the pixel group selection. Here, when the noise is large (first problem) as illustrated in FIG. 9, a pixel having the received light amount equal to or larger than the noise component value included therein is selected as the first condition. Here, the level of the noise component value is indicated as a threshold.

Specifically, out of the levels of the received light amounts of nine pixels (x=4 to 6, y=4 to 6) as selection candidates, those equal to or higher than the threshold (indicated by "H" in FIG. 10) and those lower than the threshold (indicated by "L" in FIG. 10) are determined. In addition, in the pixel group selection for filtering, the pixels indicated by "L" are excluded (indicated by solid triangles), and only seven pixels indicated by "H" are employed (indicated by blanked circles in FIG. 10).

Therefore, the simple average Av for the filtering target pixel (5, 5) is not influenced by the group of pixels (indicated by solid triangles in FIG. 10) significantly affected by noise, but is obtained as a simple average only for a group of seven pixels (indicated by blanked circles in FIG. 10) having little noise influence. As a result, it is possible to reduce a calculation error with respect to the real value.

Figure 11:
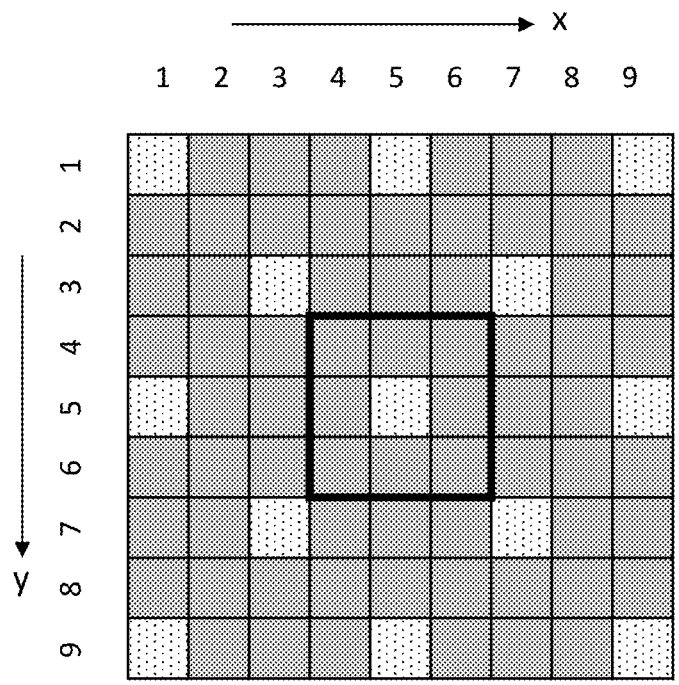
FIG. 11 is an image diagram illustrating a second range image obtained through the filtering of FIG. 9.
Figure 12:
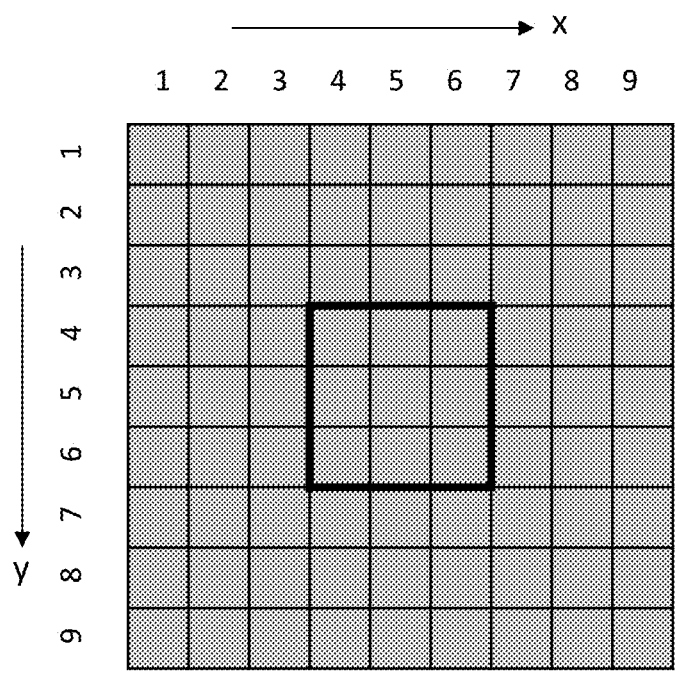
FIG. 12 is an image diagram illustrating a second range image obtained through the filtering of FIG. 10.

FIGS. 11 and 12 are image diagrams illustrating second range images obtained through the filtering of FIGS. 9 and 10, respectively. Filtering is applied to each delay time of each pixel of the camera to produce a second range image on the basis of the delay times of each pixel subjected to the filtering. In the range image, the perspective level of the distance information is expressed by shading each pixel.

In FIG. 11, due to the first problem (degradation of the S/N ratio caused by reduction of the received light amount) in the filtering of FIG. 9, pixels having distance information close to the real value and pixels having distance information far from the real value mixedly exist. Therefore, the range image is partially uneven. That is, the range image does not reflect the state of the flat wall W1.

Meanwhile, in FIG. 12, since filtering is performed only using a group of pixels having little noise influence as illustrated in FIG. 10, the first problem is addressed, and the distance information of all pixels is close to the real value. Therefore, it is possible to obtain a range image uniform over the entire image by sufficiently reflecting the state of the flat wall W1.

Here, as the first condition of pixel selection, a pixel having the received light amount of the received light amount producing unit 123 equal to or larger than the noise component value included therein is selected. Alternatively, instead of the received light amount, the delay time of the delay time producing unit 122, the range image of the first range image producing unit 13, or the luminance image of the luminance image producing unit 16 may also be referred to. Alternatively, at least one of the produced values may be equal to or larger than the noise component value. In addition, a pixel having each produced value equal to or larger than accuracy of the producing operation instead of the noise component value may also be selected.

According to the first embodiment, it is possible to reduce an error in the measurement distance even when the received light amount is reduced, and the S/N ratio is reduced. Therefore, it is possible to provide a range image with high accuracy.

Second Embodiment

In the second embodiment, reduction of the received light amount and degradation of the S/N ratio in an edge portion of an object (second problem) are employed as a degradation factor of the measurement accuracy.

Figure 13:
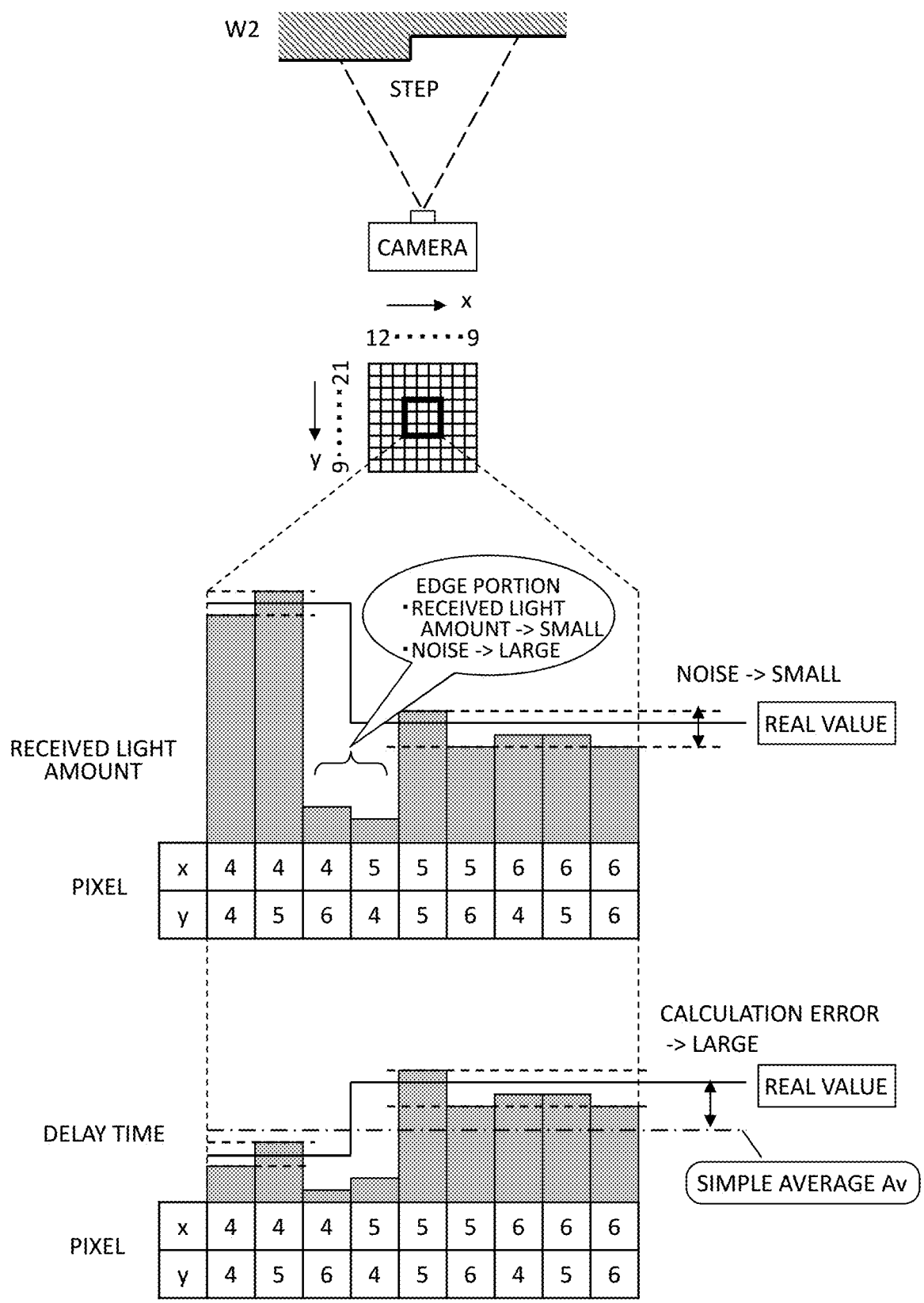
FIG. 13 is a diagram illustrating an effect on a filtering result caused by a second problem (edge portion of an object) (second embodiment)

FIG. 13 is a diagram illustrating influence on the filtering result caused by the edge portion of the object. Here, a flat wall W2 having right-angled steps is used as the measurement target. That is, a pixel region (x=4, y=4 to 6) and a pixel region (x=5 to 6, y=4 to 6) have different distances depending on the steps on the wall (two distance zones), and real values of the received light amount and the delay time are also different.

The received light amounts of each pixel far from the edge portion other than the pixels (4, 6) and (5, 4) are within a range having little noise relative to their real values. In addition, the delay times of each pixel based on these received light amounts are also within a range having little noise relative to their real values.

Meanwhile, the received light amounts of each pixel (4, 6) and (5, 4) close to the edge portion are reduced remarkably relative to their real values, so that the noise influence becomes significant. This is because reflection light from the edge portion does not appropriately reach the light-receiving unit of the camera. In addition, the delay times of each pixel based on these received light amounts are also significantly affected by noise with respect to their real values.

In the filtering between pixels including such an edge portion, the calculation error increases. That is, since there are a plurality of (two in this example) real values for the measurement value within the group of pixels used in the filtering, and the noise in the edge portion has significant influence, a calculation error in the simple average Av for the center pixel (5, 5) with respect to its real value increases.

As described above, for the edge portion of the object, filtering is performed including a group of pixels belonging to a plurality of distance zones, and the S/N ratio in the edge portion is reduced. Therefore, it is difficult to reduce the measurement error through simple filtering.

In this regard, according to this embodiment, in order to address this problem, the pixel group selection unit 141 selects only a group of pixels belonging to a distance zone having the maximum number of pixels out of a plurality of distance zones, and excludes a group of pixels belonging to a distance zone having the minimum number of pixels. In addition, the filtering unit 142 performs filtering only using a group of pixels belonging to the distance zone having the maximum number of pixels. As a result, it is possible to prevent an increase of the error in the distance measurement for the edge portion of the object. That is, a condition for selecting a group of pixels (hereinafter, referred to as "second condition") defined in the second embodiment is to select a pixel belonging to the highest frequency class by referring to a frequency distribution of the received light amount of the received light amount producing unit 123.

Figure 14:
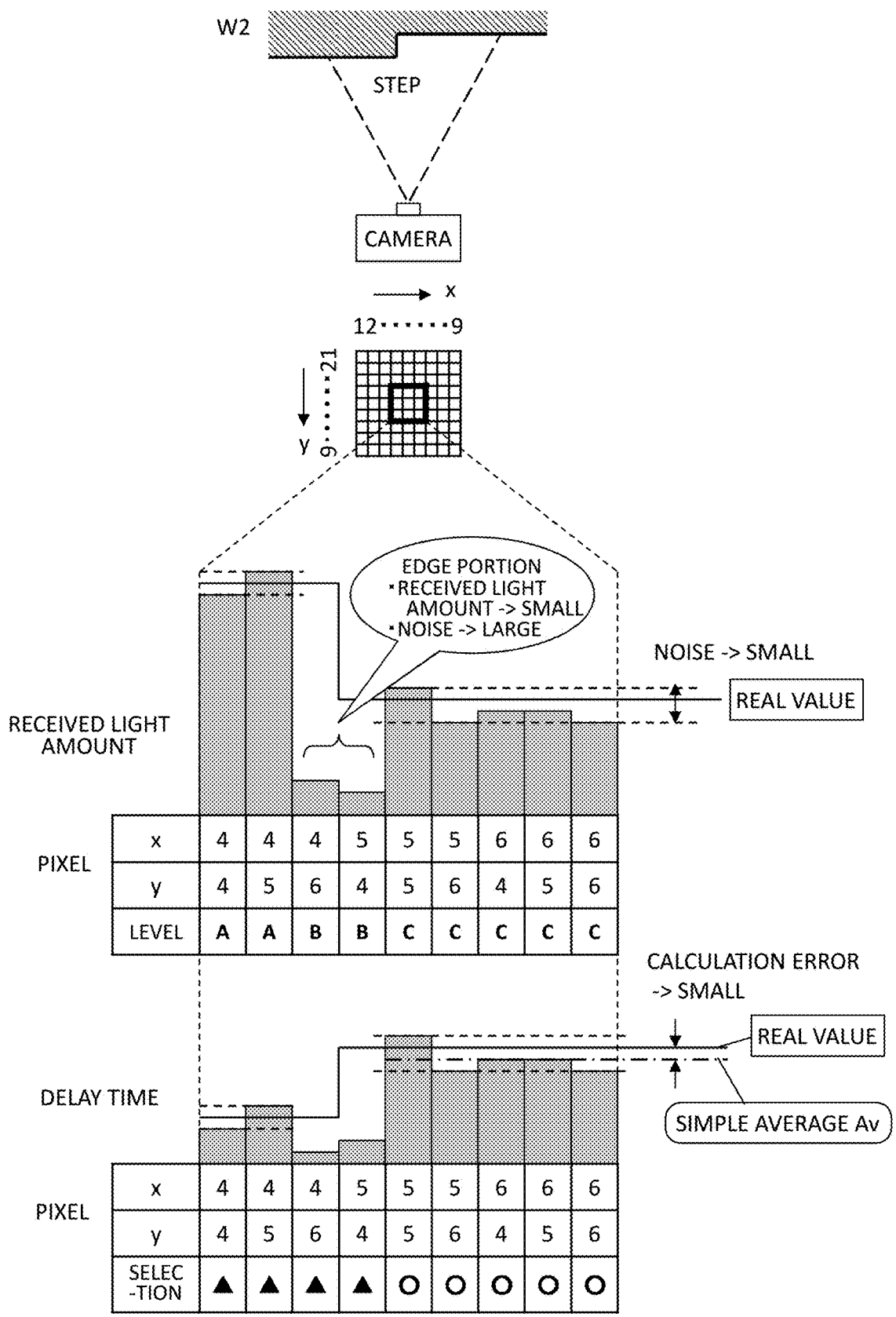
FIG. 14 is a diagram illustrating a filtering result when a group of pixels is selected depending on a second condition.

FIG. 14 is a diagram illustrating a filtering result when a group of pixels is selected so as to satisfy the second condition for the pixel group selection. Here, similar to FIG. 13, a flat wall W2 having right-angled steps is set as the measurement target (second problem), and a pixel belonging to the highest class in the frequency distribution of the received light amount is selected as a second condition.

In the second condition, each pixel is classified into a plurality of groups on the basis of the level of the received light amount. Here, the pixels may be classified into three groups A, B, and C. In addition, a pixel having the highest class in the frequency distribution is selected. In this example, the frequency distribution of the received light amount is two times for the group A, two times for the group B, and five times for the group C. Therefore, the five pixels belonging to the group C having the highest frequency distribution are selected. That is, in the pixel group selection, five pixels (x=5, y=5 to 6) and (x=6, y=4 to 6) are selected (indicated by blanked circles in FIG. 14) out of the nine candidate pixels. The group of pixels (indicated by solid triangles in FIG. 14) excluded as a result includes a group of pixels having a significant distance difference from the filtering target pixel (5, 5) or a group of pixels significantly affected by noise with little returning light in the edge portion of the object.

Therefore, the simple average Av for the filtering target pixel (5, 5) is obtained as a simple average only for a group of five pixels (indicated by blanked circles in FIG. 14) belonging to the low frequency distribution class without being influenced by a group of pixels (indicated by solid triangles in FIG. 14) belonging to the low frequency distribution class. As a result, it is possible to obtain a small calculation error relative to the real value.

Figure 15:
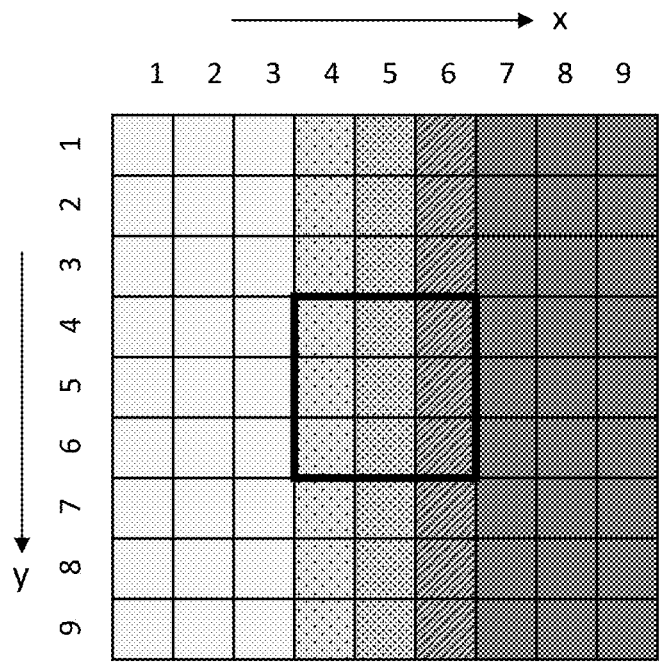
FIG. 15 is an image diagram illustrating a second range image obtained through the filtering of FIG. 13.
Figure 16:
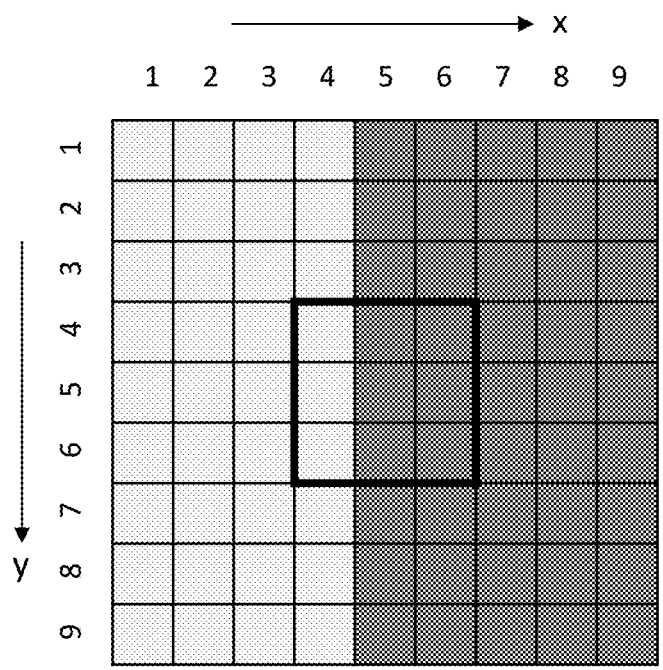
FIG. 16 is an image diagram illustrating a second range image obtained through the filtering of FIG. 14.

FIGS. 15 and 16 are image diagrams illustrating the second range image obtained from filtering of FIGS. 13 and 14, respectively. Filtering is performed for each delay time of each pixel of the camera to produce a second range image on the basis of the delay times of each pixel subjected to the filtering such that the perspective level of the distance information is expressed by shading each pixel.

In FIG. 15, due to the second problem in the filtering of FIG. 13 (existence of steps and degradation of the S/N ratio in the edge portion), the steps have smooth slopes in the range image. That is, it does not reflect the sharp steps in the original wall W2.

Meanwhile, in FIG. 16, since the filtering is performed only for a group of pixels belonging to the highest frequency distribution class as illustrated in FIG. 14, the second problem is addressed, and it is not influenced by a group of pixels having a significant distance difference or significant noise. As a result, it is possible to obtain a range image by sufficiently reflecting the state of the wall W2 having right-angled steps.

Here, as the second condition, a pixel belonging to the highest frequency class is selected with reference to the frequency distribution of the received light amount in the received light amount producing unit 123. Alternatively, a pixel may be selected with reference to the delay time of the delay time producing unit 122, the range image of the first range image producing unit 13, or the luminance image of the luminance image producing unit 16 instead of the received light amount. In addition, the selected class may not be single, but a pixel belonging to a plurality of classes may be selected on a higher frequency basis.

According to the second embodiment, even when there is a significant difference in distance around the edge portion of the object, it is possible to reduce an error in the measurement distance. Therefore, it is possible to provide a range image with high accuracy.

The present invention is not limited to the aforementioned embodiments, and may include various modifications. While the embodiments have been described in details for facilitating understanding of the invention, the invention is not limited to a case where all the components described above are provided. In addition, a part of the configuration of any embodiment may be substituted with a configuration of the other embodiment, and a configuration of any embodiment may be added to a configuration of the other embodiment. Furthermore, for a part of the configuration of each embodiment, any addition, deletion, or substitution of the other configuration may be possible.

Each of the configurations, functions, processing units, processing means, or the like described above may be realized by hardware, for example, by designing part or all of them with an integrated circuit. In addition, each of the configurations, the functions, or the like described above may be realized by software by causing a processor to interpret and execute a program that realizes each function. Information such as a program, a table, and a file for realizing each function may be placed in a memory, a hard disk, a recording device such as a solid state drive (SSD), or a recording medium such as an IC card, an SD card, or a DVD.

What is claimed is:

1. A range imaging camera for producing a range image by measuring a distance to an object on the basis of a time of flight of light, comprising:
   a light emission processing unit configured to emit irradiation light to a photographing space;
   a light receiving processing unit configured to receive reflection light from the photographing space using a predetermined number of pixels, produce a delay time from a light emission timing of the irradiation light to a light-receiving timing of the reflection light for each pixel, and produce a received light amount of the reflection light for a predetermined period of time;
   a first range image producing unit configured to produce a first range image by calculating a distance to the object on the basis of the delay time of each pixel produced by the light receiving processing unit; and
   a second range image producing unit configured to perform filtering for each pixel of the first range image by setting each pixel as a filter target pixel and, for each target pixel, using a group of two or more neighboring pixels of the filter target pixel including the filter target pixel, to produce a second range image,
   wherein the second range image producing unit has a pixel group selection unit configured to select pixels in the group of two or more neighboring pixels used in the filtering, and
   wherein the pixel group selection unit selects the pixels in the group of two or more neighboring pixels such that at least one of the produced delay time and the produced received light amount produced by the light receiving processing unit for each pixel in the group of two or more neighboring pixels is equal to or larger than a respective thresholds for the delay time and the received light amount.

2. The range imaging camera according to claim 1, further comprising a luminance image producing unit configured to produce a luminance image from the received light amount of each pixel in the light receiving processing unit,
   wherein the pixel group selection unit selects pixels in the group of two or more neighboring pixels based on a luminance image of the luminance image producing unit.

3. A range imaging method for producing a range image by measuring a distance to an object on the basis of a time of flight of light, comprising:
   a light emission processing step of emitting irradiation light to a photographing space;
   a light receiving processing step of receiving reflection light from the photographing space using a predetermined number of pixels, producing a delay time from a light emission timing of the irradiation light to a light-receiving timing of the reflection light for each pixel, and producing a received light amount of the reflection light for a predetermined period of time;
   a first range image producing step of producing a first range image by calculating a distance to the object on the basis of the delay time of each pixel produced in the light receiving processing step; and
   a second range image producing step of performing filtering for each pixel of the first range image by setting each pixel as a filter target pixel and, for each target pixel, using a group of two or more neighboring pixels of the filter target pixel including the filter target, to produce a second range image, wherein the second range image producing step has a pixel group selection step of selecting pixels in the group of two or more neighboring pixels used in the filtering, and in the pixel group selection step, the pixels in the group of two or more neighboring pixels is selected such that at least one of the produced delay time and the produced received light amount produced in the light receiving processing step for each pixel in the group of two or more neighboring pixels is equal to or larger than respective thresholds for the time delay and the received light amount.

4. The range imaging method according to claim 3, further comprising a luminance image producing step of producing a luminance image from the received light amount of each pixel in the light receiving processing step, wherein, in the pixel group selection step, the pixels in the group of two or more neighboring pixels is selected based on the luminance image of the luminance image producing step.

* * * * *